United States Patent
Yang et al.

(10) Patent No.: US 10,200,215 B2
(45) Date of Patent: Feb. 5, 2019

(54) METHOD AND USER EQUIPMENT FOR RECEIVING SIDELINK SYNCHRONISATION SIGNAL FOR PROXIMITY SERVICE

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/563,096

(22) PCT Filed: Apr. 5, 2016

(86) PCT No.: PCT/KR2016/003498
§ 371 (c)(1),
(2) Date: Sep. 29, 2017

(87) PCT Pub. No.: WO2016/163708
PCT Pub. Date: Oct. 13, 2016

(65) Prior Publication Data
US 2018/0076984 A1    Mar. 15, 2018

Related U.S. Application Data

(60) Provisional application No. 62/146,406, filed on Apr. 13, 2015, provisional application No. 62/144,959, filed on Apr. 9, 2015.

(51) Int. Cl.
*H04W 56/00* (2009.01)
*H04W 76/23* (2018.01)
(Continued)

(52) U.S. Cl.
CPC ............. *H04L 25/03* (2013.01); *H04L 5/00* (2013.01); *H04L 5/22* (2013.01); *H04L 7/04* (2013.01);
(Continued)

(58) Field of Classification Search
CPC ........... H04W 56/001; H04W 56/0015; H04W 56/0025; H04W 76/14; H04W 76/23
See application file for complete search history.

(56) References Cited

U.S. PATENT DOCUMENTS

| | | | |
|---|---|---|---|
| 2014/0328329 A1 | 11/2014 | Novlan et al. | |
| 2017/0150480 A1* | 5/2017 | Kim | H04W 72/02 |
| 2017/0280344 A1* | 9/2017 | Siomina | H04W 24/10 |

FOREIGN PATENT DOCUMENTS

| | | |
|---|---|---|
| KR | 1020130028106 | 3/2013 |
| KR | 1020130063940 | 6/2013 |

OTHER PUBLICATIONS

3GPP TS 3.211 v10.4.0, Dec. 2011.
(Continued)

*Primary Examiner* — Scott M Sciacca
(74) *Attorney, Agent, or Firm* — Dentons US LLP

(57) ABSTRACT

A disclosure of the present specification provides a method for receiving a sidelink synchronisation signal (SLSS) for proximity service (ProSe). The method may comprise the steps of: receiving an SLSS from a neighbouring ProSe UE; and measuring a reference signal received power (RSRP) of the SLSS during a pre-determined measurement period. The measurement step can be executed assuming that the SLSS transmission from the neighbouring ProSe UE during the measurement period is not abandoned more than once. The measurement period can be extended if the SLSS transmission from the neighbouring ProSe UE is abandoned more than once.

12 Claims, 11 Drawing Sheets

(51) Int. Cl.
    *H04L 25/03*     (2006.01)
    *H04L 5/00*     (2006.01)
    *H04L 7/04*     (2006.01)
    *H04L 7/08*     (2006.01)
    *H04W 76/14*     (2018.01)
    *H04L 5/22*     (2006.01)

(52) U.S. Cl.
    CPC ............... *H04L 7/08* (2013.01); *H04W 56/00* (2013.01); *H04W 76/14* (2018.02)

(56) References Cited

OTHER PUBLICATIONS

Ericsson et al., "RRM Requirements for ProSe," R4-151126, 3GPP TSG-RAN WG4 Meeting #74, Athens, Greece, Feb. 16, 2015, p. 24.
LG Electronics Inc., "Clarification of SLSS Transmission Timing," R2-150537, 3GPP TSG-RAN WG2 #89, Athens, Greece, Jan. 31, 2015, pp. 3-5.
3GPP TS 36.211 v10.4.0, Dec. 2011.

\* cited by examiner

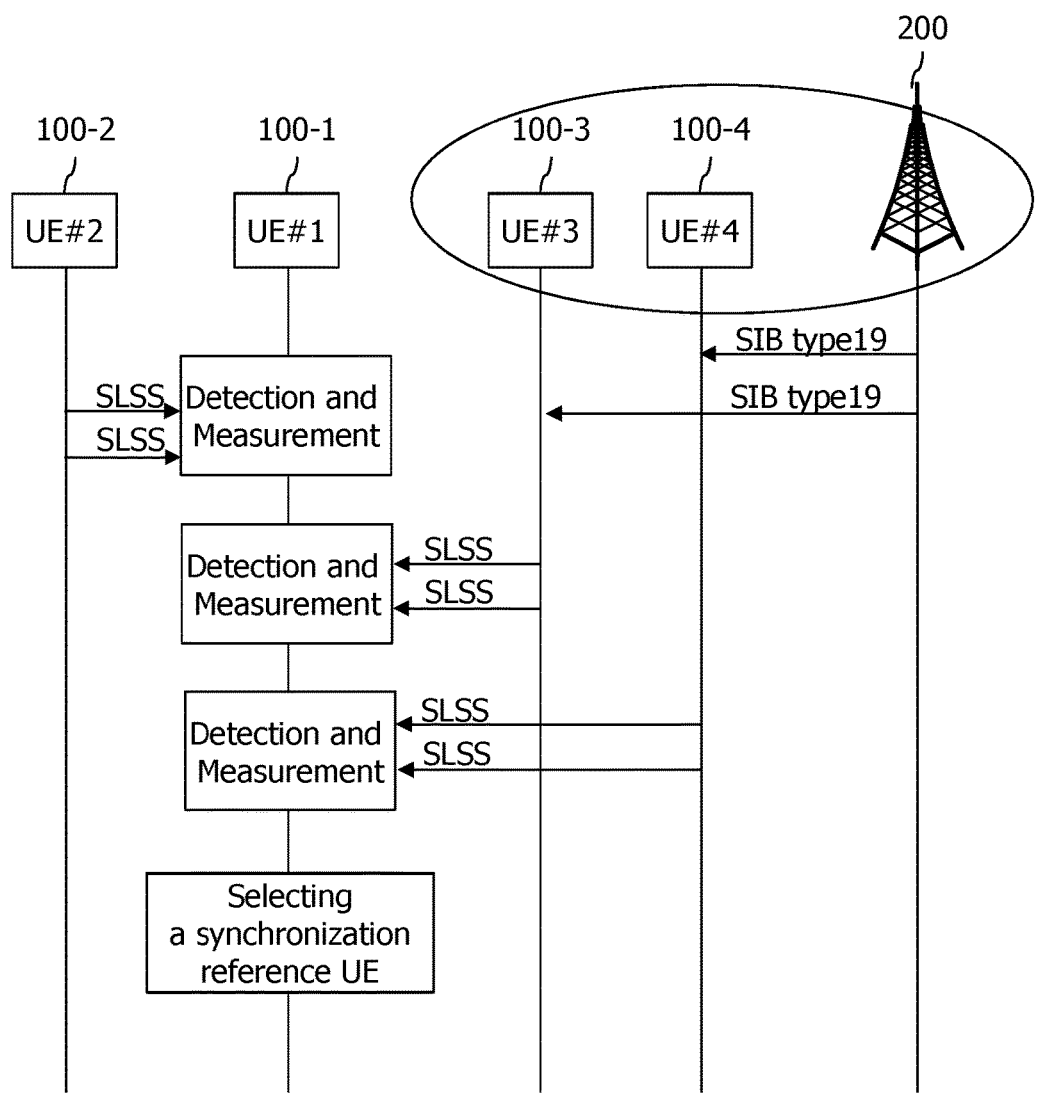

METHOD AND USER EQUIPMENT FOR RECEIVING SIDELINK SYNCHRONISATION SIGNAL FOR PROXIMITY SERVICE

CROSS-REFERENCE TO RELATED APPLICATIONS

This application is the National Stage filing under 35 U.S.C. 371 of International Application No. PCT/KR2016/003498, filed on Apr. 5, 2016, which claims the benefit of U.S. Provisional Applications No. 62/144,959 filed on Apr. 9, 2015, and No. 62/146,406 filed on Apr. 13, 2015, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, due to an increase user requirements for SNS (Social Network Service), communication among UEs physically close to each other, that is, D2D (Device to Device) communication is required.

Such D2D communication is also referred to as Proximity Service (ProSe). The LE performing the neighboring service is also referred to as a ProSe UE. A link between UEs used in the D2D communication is also referred to as a sidelink.

The ProSe UE transmits and receives a Sidelink Synchronization signal (SLSS). The ProSe UEs outside the coverage of the base station a ProSe UE within the coverage the base station as synchronization reference UEs. To this end, the ProSe UE outside the coverage of the base station measures the RSRP (reference signal received power) for the SLSS received from the ProSe UE within the coverage of the base station.

However, when the SLSS is not received in an interval for measuring the RSRP for the SLSS, there is a problem that the synchronization reference UE can not be selected.

SUMMARY OF THE INVENTION

Accordingly, an object of the present invention is to solve the above-mentioned problems.

To achieve the objection, according to the one embodiment of the present specification, there is provided a method for receiving a sidelink synchronization signal: (SLSS) for a proximity service (ProSe). The method may be performed by a ProSe user equipment (UE) and comprise: receiving a SLSS from a neighboring ProSe UE; and measuring a reference signal received power (RSRP) with respect to the SLSS. The measurement may be performed by regarding that the neighboring ProSe UE does not drop up to one a transmission of the SLSS during a measurement period. If the neighboring ProSe UE drops more than one the transmission of the SLSS during the measurement period, the measurement period may be extended.

The measurement period may be 400 ms, and the SLSS may be transmittable from the neighbor ProSe UE with a period of 40 ms.

The step of measuring may be performed by considering that the SLSS transmission from the neighboring ProSe UE is to be dropped up to 2% within 20 seconds.

The step of measuring may further comprise a step of determining whether the measured RSRP for the SLSS meets an accuracy of absolute reference and accuracy of relative reference.

The step of measuring may further comprise a step of selecting the neighboring ProSe UE as a synchronization reference UE, when the measured RSRP for the SLSS is greater than a predetermined minimum requirement by a predetermined hysteresis.

The step of selecting may further comprise a step of determining whether the neighboring ProSe UE is positioned within the coverage of a base station.

To achieve the objection, a disclosure of the present specification, may provide a User Equipment (UE) for receiving a Sidelink Synchronization signal (SLSS) for Proximity Service (ProSe). The UE may comprise a RF unit; and a processor configured to control the RF unit to receive a SLSS from a neighboring ProSe UE, and to measure a reference signal received power (RSRP) of the SLSS during a predetermined measurement period. The measurement may be performed by regarding that the neighboring ProSe UE does not drop up to one a transmission of the SLSS during a measurement period. The process may extend the measurement period, if the neighboring ProSe UE drops more than one the transmission of the SLSS during the measurement period.

According to the embodiment of the present disclosure, the aforementioned problem of the related art is solved.

BRIEF DESCRIPTION OF THE DRAWINGS

FIG. 8 illustrates a process in which the UE #1 100-1 shown in FIG. 7 selects a synchronization reference UE based on a sidelink synchronization signal (SLSS) from a neighboring UE.

DESCRIPTION OF EXEMPLARY EMBODIMENTS

Figure 1:
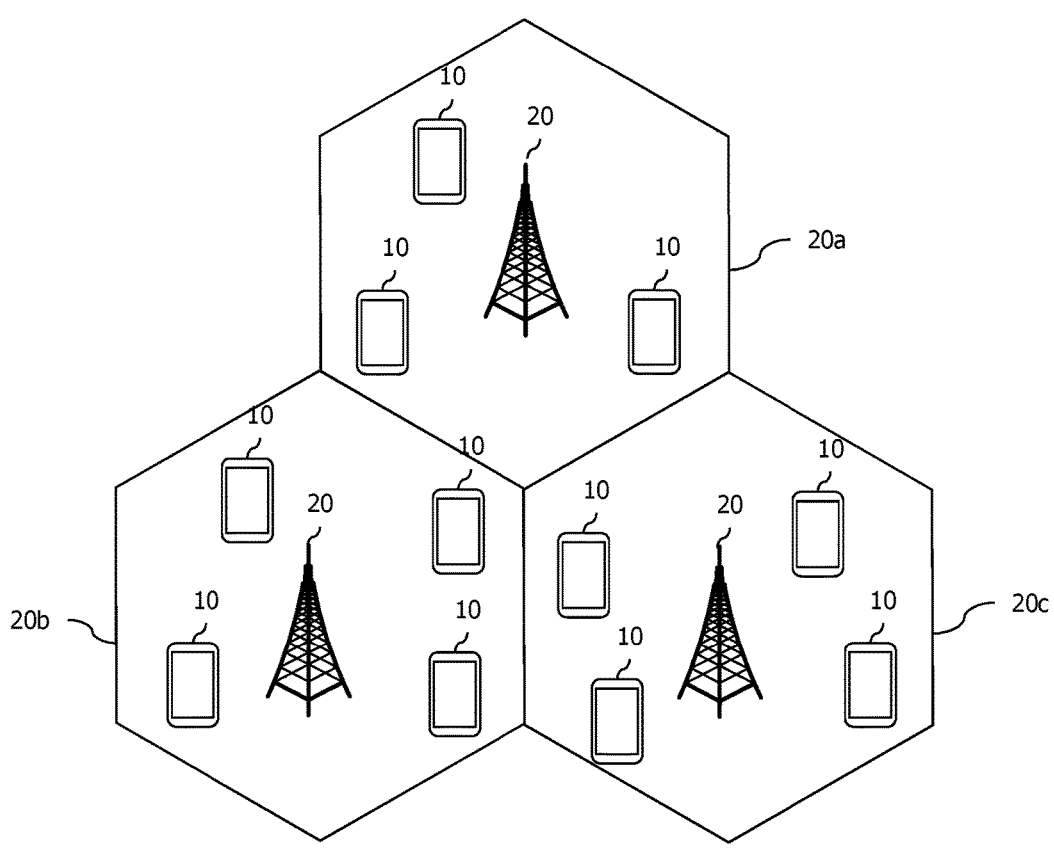
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

The operating band used in the above wireless communication system is as follows.

TABLE 1

| Operating Band) | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

In this case, $F_{UL\_low}$ means the lowest frequency of an UL operating band. Furthermore, $F_{UL\_high}$ means the highest frequency of an UL operating band. Furthermore, $F_{DL\_low}$ means the lowest frequency of a DL operating band. Furthermore, $F_{DL\_high}$ means the highest frequency of a DL operating band.

Then, the band is grouped as follows.

TABLE 2

| | E-UTRA FDD | | E-UTRA TDD | |
|---|---|---|---|---|
| Group | Band group name | Operating band | Band group name | Operating band |
| A | FDD_A | 1, 4, 6, 10, 11, 18, 19, 21, 23, 24, 32, 67 | TDD_A | 33, 34, 35, 36, 37, 38, 39, 40, 45 |
| B | FDD_B | 65, 66 | TDD_B | — |
| C | FDD_C | 9, 30 | TDD_C | 42, 43 |
| D | FDD_D | 28 | TDD_D | — |
| E | FDD_E | 2, 5, 7, 27 | TDD_E | 41, 44 |
| F | FDD_F | 26 | TDD_F | — |
| G | FDD_G | 3, 8, 12, 13, 14, 17, 20, 22, 29 | TDD_G | — |
| H | FDD_H | 25 | TDD_H | — |
| I | FDD_I | — | TDD_I | — |
| J | FDD_J | — | TDD_J | — |

TABLE 2-continued

| Group | E-UTRA FDD Band group name | E-UTRA FDD Operating band | E-UTRA TDD Band group name | E-UTRA TDD Operating band |
|---|---|---|---|---|
| K | FDD_K | — | TDD_K | — |
| L | FDD_L | — | TDD_L | — |
| M | FDD_M | — | TDD_M | — |
| N | FDD_N | 31 | TDD_N | — |

Hereinafter, the LTE system will be described in detail.

Figure 2:
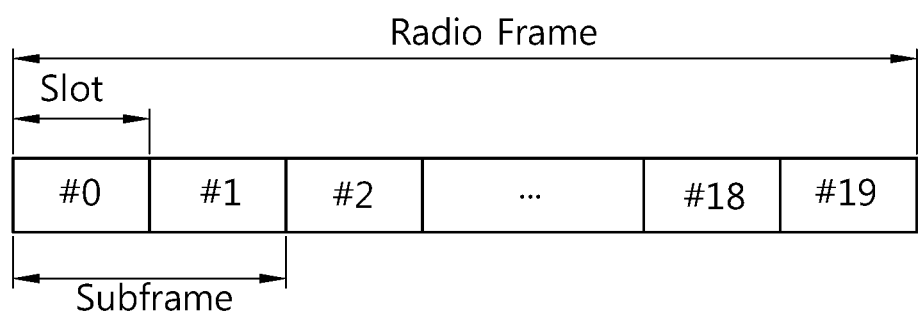
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
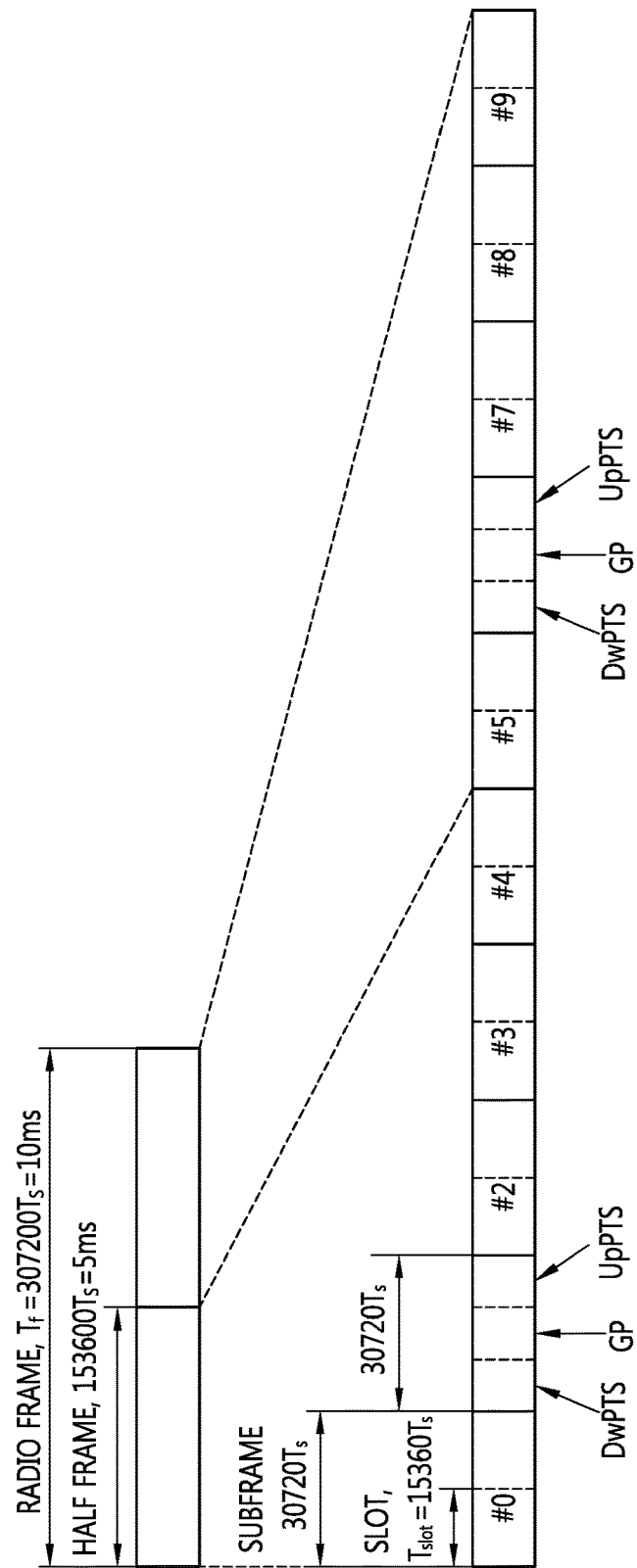
FIG. 3 illustrates a structure of a downlink radio frame according to TDD in the 3GPP LTE.

FIG. 3 Illustrates the Architecture of a Downlink Radio Frame According to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 3

| UL-DL config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 4

| Special subframe config-uration | Normal CP in downlink | | | Extended CP in downlink | | |
|---|---|---|---|---|---|---|
| | DwPTS | UpPTS Normal CP in uplink | UpPTS Extended CP in uplink | DwPTS | UpPTS Normal CP in uplink | UpPTS Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

Figure 4:
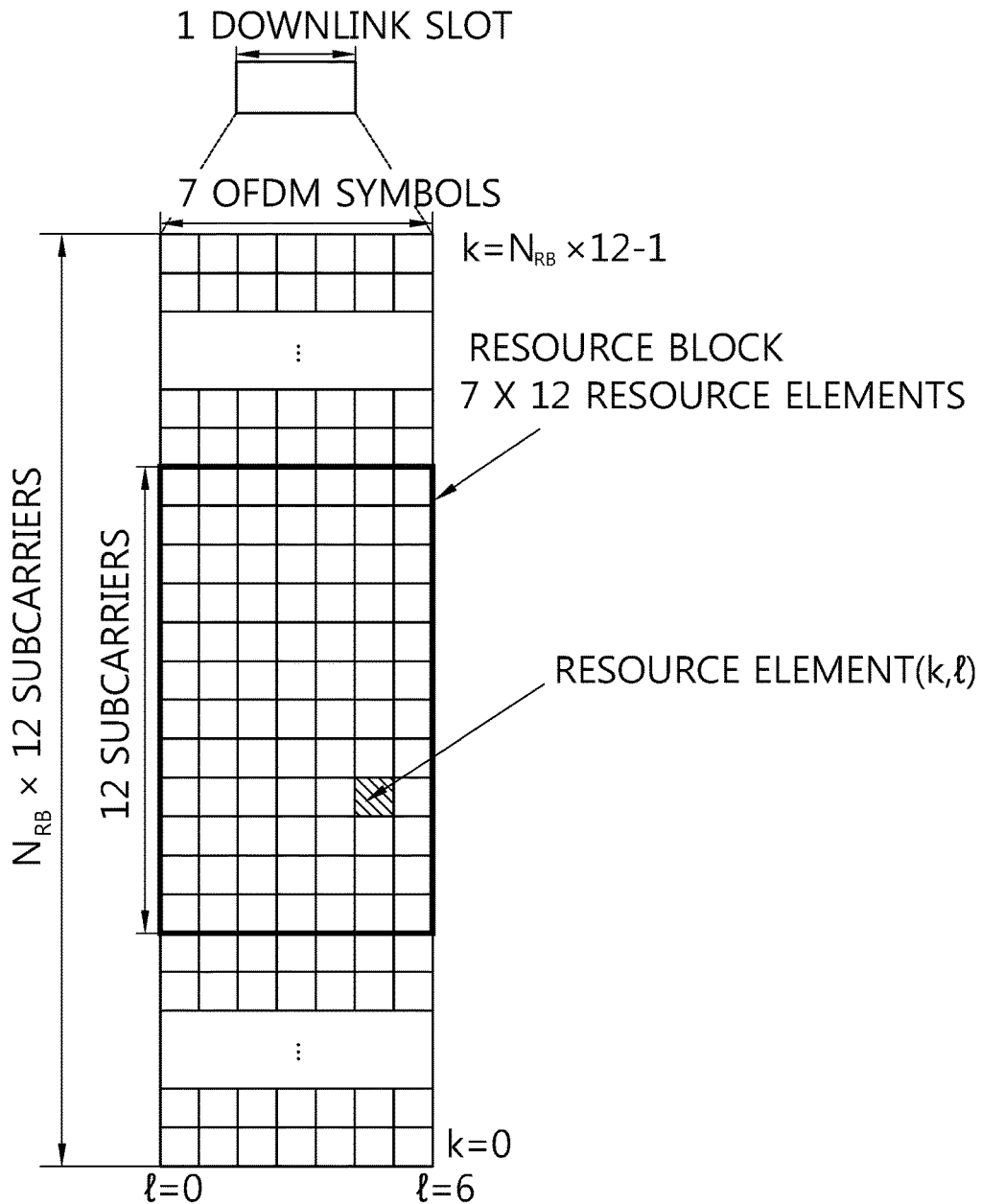
FIG. 4 is an exemplary diagram illustrating a resource grid for one uplink or downlink slot in the 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Downlink Reference Signal>

On the other hand, a reference signal (RS) will be described below.

Generally, transmission information, e.g., data, is easily distorted or changed while being transmitted over a wireless channel Therefore, a reference signal is required to demodulate such transmission information without an error.

The downlink reference signal is divided into a cell-specific RS (CRS), a multimedia broadcast and multicast single frequency network (MBSFN) reference signal, a UE-specific RS (URS), a positioning RS (PRS), and a channel state information reference signal (CSI-RS). The CRS is a reference signal transmitted to all UEs in a cell and thus may be referred to as a common reference signal. The CRS may be used for channel estimation for CQI feedback and channel estimation for PDSCH. The MBSFN reference signal may be transmitted in a subframe allocated for MBSFN transmission. The URS may be referred to as a demodulation reference signal (DM-RS) with reference signals received by a specific UE or a specific UE group in the cell. The DM-RS is used mainly for data demodulation by a specific UE or a specific UE group. The PRS may be used to estimate a position of the UE. The CSI-RS is used for channel estimation for the PDSCH of the LTE-A UE. The CSI-RS is relatively sparsely placed in the frequency domain or time domain and may be punctured in the data domain of the normal subframe or MB SFN subframe.

Figure 5:
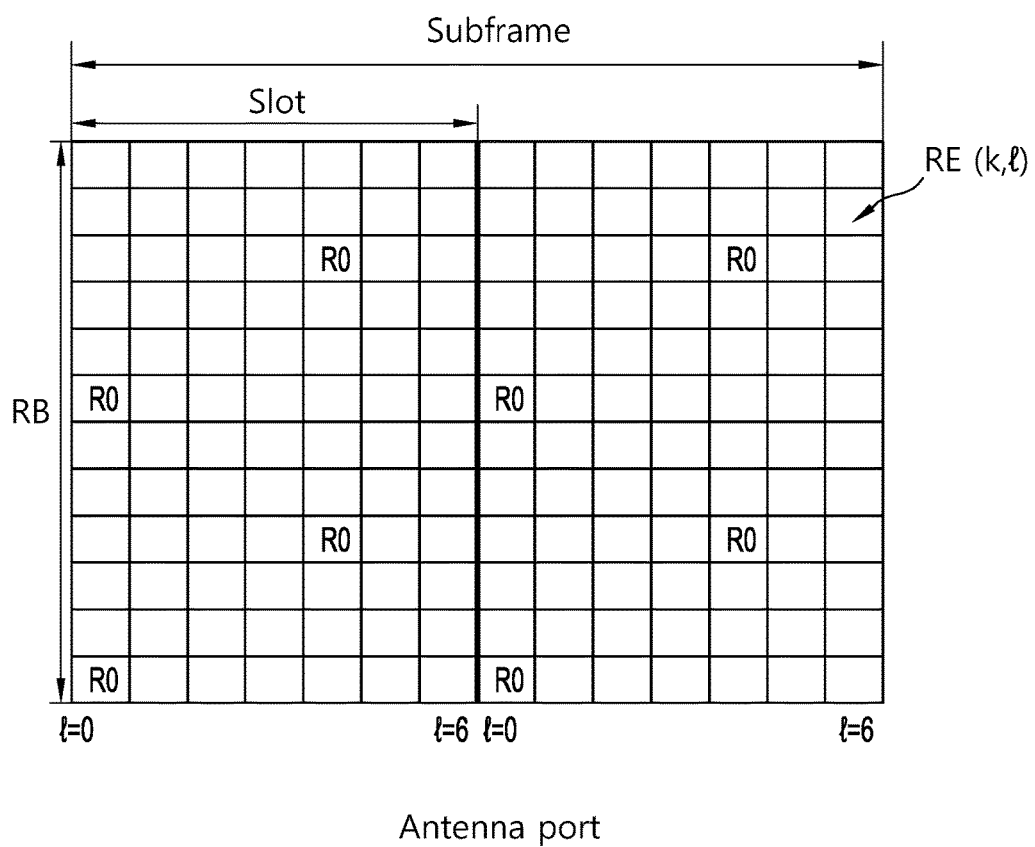
FIG. 5 illustrates an exemplary pattern with which a CRS is mapped to a RB, if a base station uses a single antenna port.

FIG. 5 Illustrates an Exemplary Pattern with which a CRS is Mapped to a RB, if a Base Station Uses a Single Antenna Port.

Referring to FIG. 5, R0 denotes an RE to which the CRS transmitted by the antenna port number 0 of the base station is mapped.

The CRS is transmitted in all downlink subframes within the cell supporting PDSCH transmission. The CRS may be transmitted on antenna ports 0 through 3.

The resource element (RE) allocated to the CRS of one antenna port can not be used for transmission of another antenna port and should be set to zero. Also, in a multicast-broadcast single frequency network (MBSFN) subframe, the CRS is transmitted only in a non-MBSFN region.

<Measurement and Measurement Report>

In the mobile communication system, mobility support of the UE 100 is essential. Accordingly, the UE 100 continuously measures the quality of a serving cell currently providing services and the quality of a neighboring cell. The UE 100 reports the measurement results to the network at an appropriate time, and the network provides the best mobility to the UE through handover or the like. Often, measurements of this purpose are referred to as radio resource management (RRM).

Meanwhile, the UE 100 monitors a downlink quality of the primary cell (Pcell) based on the CRS. This is referred to as a Radio Link Monitoring (RLM). For the RLM, the UE 100 estimates the downlink quality and compares the estimated downlink quality with thresholds, e.g., Qout and Qin. The threshold value Qout is defined as a level at which the downlink cannot be stably received, which corresponds to a 10% error of the PDCCH transmission considering a PCFICH error. The threshold value Qin is defined as a level at which the downlink is too much reliable compared with the Qout, which corresponds to a 2% error of the PDCCH transmission considering the PCFICH error.

Figure 6:
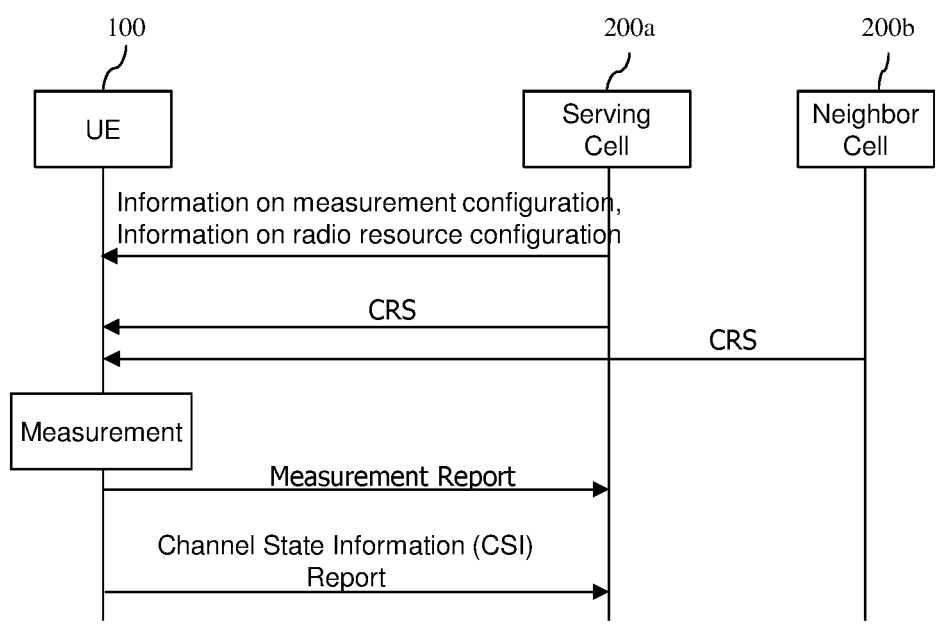
FIG. 6 illustrates a measurement and a measurement report procedure.

FIG. 6 Illustrates a Measurement and a Measurement Report Procedure.

Referring to FIG. 6, when the serving cell 200a and the neighboring cell 200b transmit a cell-specific reference signal (CRS) to the UE 100, respectively, the UE 100 performs measurement, through the CRS, and transmits an RRC measurement report message including the measurement result to the serving cell 200a.

In this case, the UE 100 can perform measurement in the following three methods.

1) RSRP (reference signal received power): Indicates an average received power of all REs carrying CRSs transmitted over the entire band. It is also possible to measure the average received power of all REs carrying the CSI RS instead of the CRS.

2) RSSI (Received Signal Strength Indicator): Indicates a received power measured in the entire band. The RSSI includes all of signal, interference, and thermal noise.

3) Reference symbol received quality (RSRQ): Indicates the CQI and may be determined by an RSRP/RSSI depending on the measured bandwidth or subband. That is, the RSRQ means a signal-to-noise interference ratio (SINR). Since the RSRP does not provide sufficient mobility information, the RSRQ may be used instead of RSRP in handover or cell reselection.

The RSRQ may be calculated as RSRQ=RSSI/RSSP.

Meanwhile, the UE 100 receives a measurement configuration (hereinafter also referred to as "measconfig") information element (IE) from the serving cell 100a for the measurement. A message including the measurement configuration Information Element (IE) is referred to as a measurement configuration message. Here, the measurement configuration Information Element (IE) may be received via an RRC Connection Reconfiguration message. The UE reports the measurement result to the base station if the measurement result meets the reporting condition in the measurement configuration information. A message including a measurement result is referred to as a measurement report message.

The measurement configuration IE may include measurement object information. The measurement object information is information on an object to be measured by the UE. The measurement object includes at least one of an intra-frequency measurement object to be measured in a cell, an inter-frequency measurement object to be measured among cells, and an inter-RAT measurement object to be an inter-RAT measurement. For example, an intra-frequency measurement object indicates a neighboring cell having the same frequency band as a serving cell, an inter-frequency measurement object indicates an adjacent cell having a frequency band different from that of the serving cell, and an inter-RAT measurement object can indicate the adjacent cell of the RAT different from the RAT of the serving cell.

Specifically, the measurement configuration IE includes an IE (information element) as shown in the following table.

TABLE 5

MeasConfig ::=
-- Measurement objects
    measObjectToRemoveList
    measObjectToAddModList
-- Other parameters
    measGapConfig The Measurement objects IE includes measObjectToRemoveList indicating a list of measObjects to be removed and measObjectToAddModList indicating a list to be newly added or modified.

Meanwhile, the measGapConfig is used to configure or release a measurement gap (MG).

The measurement gap MG is an interval for performing cell identification and RSRP measurement on a different frequency from the serving cell.

Meanwhile, the UE 100 also receives a Radio Resource Configuration Information Element (IE) as shown.

The Radio Resource Configuration Dedicated Information Element (IE) is used for configuring/modifying/releasing a Radio Bearer, modifying a MAC configuration, and the like. The Radio Resource Configuration IE includes subframe pattern information. The subframe pattern information is information on a measurement resource restriction pattern on the time domain for measuring the RSRP and RSRQ for a serving cell (e.g., a primary cell).

<D2D (Device to Device) Communication>

On the other hand, the D2D communication expected to be introduced in the next generation communication system will be described below.

Figure 7:
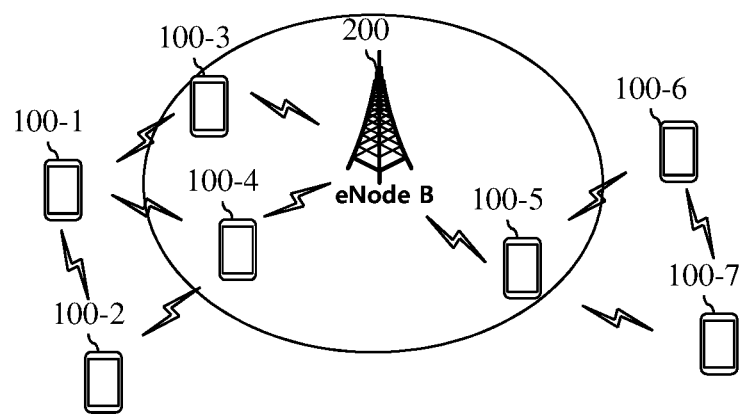
FIG. 7 illustrates a concept of D2D (Device to Device) communication expected to be introduced in the next generation communication system.

FIG. 7 Illustrates a Concept of D2D (Device to Device) Communication Expected to be Introduced in the Next Generation Communication System.

Due to the increase in user requirements for SNS (Social Network Service), communication between UEs physically close to each other, that is, D2D (Device to Device) communication has been required.

In order to reflect the above-described requirements, as shown in FIG. 6, a method for directly enabling communication without intervention of the base station (eNodeB) 200 has been discussed, among UE #1 100-1, the UE #2 100-2, the UE #3 100-3, UE #4 100-4, or among UE #5 100-5, UE #6 100-6, UE #7 100-7, and UE #8 100-8. Of course, with the help of the base station (eNodeB) 200, they can communicate directly between the UE #1 100-1 and the UE #5 100-5. Meanwhile, the UE #3 100-3 or the UE #4 100-4 may serve as a repeater for the UE #1 100-1 and the UE #2 100-2.

Meanwhile, D2D communication is also referred to as Proximity Service (ProSe). The UE performing the Proximity Service is also referred to as a ProSe UE. A link between UEs used in the D2D communication is also called a sidelink. The frequency band that can be used for the sidelink is as follows.

TABLE 6

| Sidelink band | E-UTRA band | Transmission $F_{UL\_low}$-$F_{UL\_high}$ | Reception $F_{DL\_low}$-$F_{DL\_high}$ | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

The physical channels used in the sidelink are as follows.
PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

In addition, the physical signals used in the sidelink are as follows.
Demodulation Reference signal (DMRS)
Sidelink Synchronization signal (SLSS)

The SLSS includes a primary sidelink synchronization signal (Primary SLSS) and a secondary sidelink synchronization signal (Secondary SLSS: SSLSS).

FIG. 8 Illustrates a Process in which the UE #1 100-1 Shown in FIG. 7 Selects a Synchronization Reference UE Based on a Sidelink Synchronization Signal (SLSS) from a Neighboring UE.

The UE #1 100-1 and the UE #2 100-2 shown in FIG. 8 are positioned outside the coverage of the base station as shown in FIG. 8 and the UE #3 100-3 and the UE #4 100-4 are positioned within the coverage of the base station.

The UE #3 100-3 and UE #4 100-4 positioned within the coverage receive SIB type 19 from the base station.

The SIB type 19 includes discSyncConfig as follows.

TABLE 7

| SIB Type 19 | |
|---|---|
| discSyncConfig | Indicates a configuration as to whether the UE is allowed to receive or transmit synchronization information. The base station (E-UTRAN) may configure discSyncConfig when it intends to allow for the UE to transmit synchronization information using dedicated signaling. |

The discSyncConfig includes SL-SyncConfig. The SL-SyncConfig includes configuration information for SLSS reception and SLSS transmission as shown in the following table.

TABLE 8

| SL-SyncConfig field description | |
|---|---|
| discSyncWindow | Indicates a synchronization window in which value w1 the UE expects the SLSS. The value corresponds may be configured to w1 or w2. The represents 5 milliseconds, and the value w2 to the length of the normal CP divided by 2. |
| syncTxPeriodic | Indicates whether the UE transmits the SLSS once or periodically (e.g., every 40 ms) within each period of a detection signal transmitted by the UE. For periodic transmissions, the UE also transmits a MasterInformationBlock-SL. |
| syncTxThreshIC | Indicates the threshold used when in coverage. If the measured RSRP value for counterpart UE (recognized as a cell) selected for sidelink communication is lower than the threshold, then the UE may transmit the SLSS for sidelink communication with the counterpart UE. |
| txParameters | Includes parameters for configuration for transmission |

The UE #3 (100-3) and the UE #4 (100-4) receiving the SIB type 19 transmit the SLSS.

On the other hand, since the UE #2 100-2 is positioned outside the coverage of the base station, the UE #2 100-2 cannot receive the SIB type 19, and thus transmits the SLSS depending on a preset parameter.

The UE #1 100-1 detects and measures the SLSS from neighboring UEs for sidelink communication. Then, the UE #1 100-1 selects a synchronization reference UE (also referred to as a SyncRef UE). The synchronization reference UE is a ProSe synchronization source capable of transmitting a synchronization signal for ProSe.

In this manner, the UE #1 100-1 uses preset parameters for detection and measurement.

The parameters used in advance by the UE #1 100-1 and the UE #2 100-2 are SL-Preconfiguration as follows, and the SL-Preconfiguration includes information as shown in the following table.

TABLE 9

| SL-Preconfiguration | |
|---|---|
| carrierFreq | Indicates a carrier frequency to use for sidelink operation |
| SL-PreconfigSync | Preset configuration for SLSS |

The SL-PreconfigSync includes information as shown in the following table.

TABLE 10

| SL-PreconfigSync | |
|---|---|
| syncCP-Len | CP length to be used for the SLSS |
| syncRefDiffHyst | If the hysteresis value used for evaluating by relatively comparing the synchronization reference UE (SyncRef UE) is configured to dB0, then it means 0 dB. |
| syncRefMinHyst | If the hysteresis value used for evaluating by comparing the synchronization reference UE (SyncRef UE) with its absolute value is configured to dB0, then it means 0 dB. |

Meanwhile, the UE #1 100-1 calculates the S-RSRP for the SLSS received from each UE, to select a synchronized reference UE (SyncRef UE), and determines whether the UE S-RSRP in coverage is selected as a candidate, even if the UE S-RSRP out of coverage is larger, when the UE S-RSRP in the coverage is above than the minimum value indicated in the syncRefMinHyst, and if the highest S-RSRP among the UE out of the coverage exceeds the minimum value indicated in the syncRefMinHyst, then the UE that has transmitted the highest S-RSRP is selected as the candidate of the synchronization reference UE, when the UE S-RSRP in the coverage is not above than the minimum value indicated in the syncRefMinHyst.

If the UE selected as the candidate further satisfies another condition, then the UE #1 100-1 finally selects the UE as a SyncRef UE.

Meanwhile, the UE #1 100-1 determines whether an SLSS having a higher S-RSRP is received. If the SLSS having a higher S-RSRP is received, then the UE #1 100-1 determines whether the higher S-RSRP is larger than the S-RSRP of the selected synchronization reference UE by the value indicated in the syncRefDiffHyst. If it is larger, then the UE that has transmitted the SLSS with the higher S-RSRP is reselected to the synchronization reference UE.

On the other hand, an Absolute S-RSRP Accuracy and Relative Accuracy of S-RSRP are required for the S-RSRP measurement on the intra-frequency.

The Absolute S-RSRP Accuracy is as follows.

TABLE 11

| Accuracy | | | Condition | | | |
|---|---|---|---|---|---|---|
| General condition | Extreme condition | $\hat{E}s/Iot$ | Operating band group | Io | | |
| | | | | MIN Io | | MAX Io |
| dB | dB | dB | | dBm/15 kHz | dBm/BW$_{Channel}$ | dBm/BW$_{Channel}$ |
| ±[4.5] | ±[9] | ≥−6 dB | FDD_D | −119.5 | N/A | −70 |
| | | | FDD_E | −119 | N/A | −70 |
| | | | FDD_F | −118.5 | N/A | −70 |
| | | | FDD_G | −118 | N/A | −70 |
| | | | FDD_N | −114.5 | N/A | −70 |
| ±8 | ±11 | ≥−6 dB | FDD_D, FDD_E, FDD_F, FDD_G, FDD_N | N/A | −70 | −50 |

The above $\hat{E}s$ represents the received energy per RE in an effective part of symbol (i.e., excluding CP).

The Io represents the maximum power of the received signal including the signal and interference.

The Iot represents the power density of the total noise and interference in a specific RE.

Meanwhile, the Relative Accuracy of S-RSRP is defined as S-RSRP measured from another ProSe synchronization source compared to S-RSRP measured from one ProSe synchronization source. The Relative Accuracy of S-RSRP is as follows.

TABLE 12

| Accuracy | | | Condition | | |
|---|---|---|---|---|---|
| General condition dB | Extreme condition dB | $\hat{E}s/Iot$ dB | Operating band group | Io range | |
| | | | | MIN Io dBm/15 kHz | MAX Io dBm/BW$_{Channel}$ |
| ±[2] | ±[3] | ≥−3 dB | FDD_D | −119.5 | −50 |
| | | | FDD_E | −119 | −50 |
| | | | FDD_F | −118.5 | −50 |
| | | | FDD_G | −118 | −50 |
| | | | FDD_N | −114.5 | −50 |
| ±[3] | ±[3] | ≥−6 dB | | | |

Absolute accuracy and relative accuracy for the S-RSRP measurements as described above are required. These measurement accuracies should all be satisfied within a predetermined measurement period (i.e., a predetermined number of measurements). According to the current standard document, the interval in which the measurement accuracy is to be satisfied is 5 subframes (i.e., the number of times for measurement accuracy is 5). For example, when there are 20 subframes receiving the SLSS, the S-RSRP measured in each of at least 5 subframes should satisfy the measurement accuracy. It uses 5 subframes of predetermined interval for the accuracy in RSRP measurement using existing CRS.

Figure 9A:
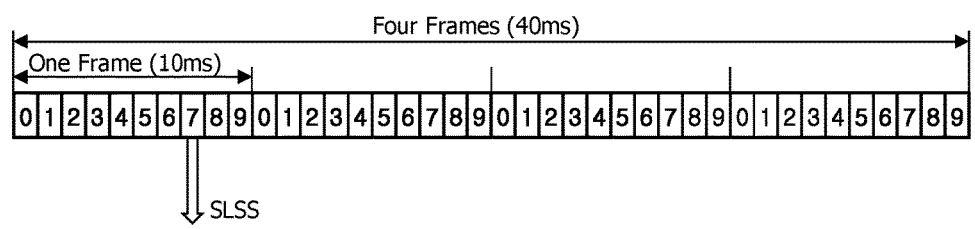
FIG. 9A illustrates the period in which the SLSS is transmitted.
Figure 9B:
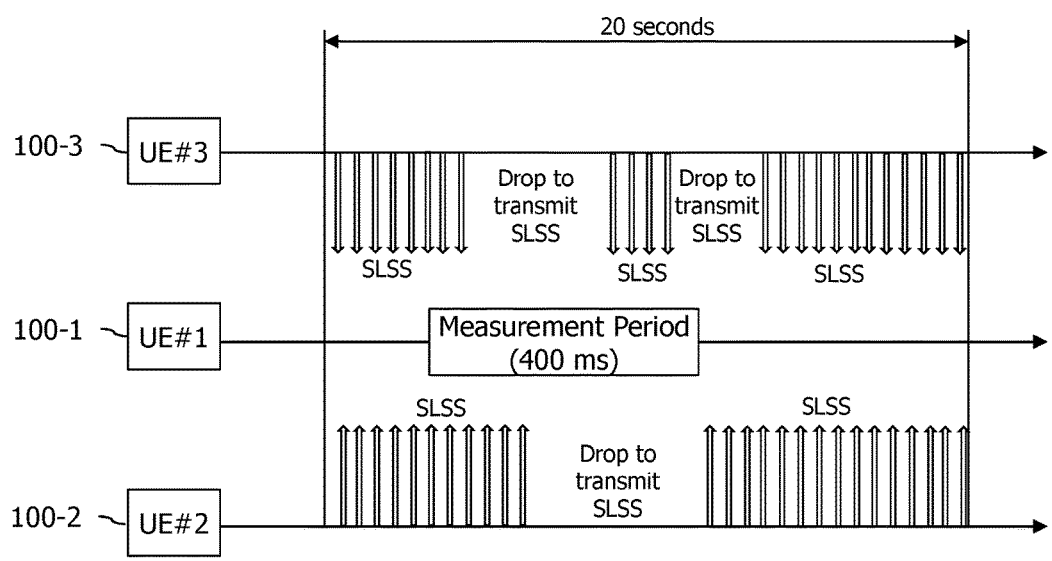
FIG. 9B illustrates the measurement of the SLSS.

FIG. 9A Illustrates the Period in which the SLSS is Transmitted, and FIG. 9B Illustrates the Measurement of the SLSS.

Referring to FIG. 9A, the UE transmitting SLSS can transmit the SLSS every 40 ms (i.e., 4 frames or 40 subframes) indicated by syncTxPeriodic in the above table.

Referring to FIG. 9B, according to the current standard document, the UE #1 100-1 determines that a new UE can be detected within 20 seconds indicated by the Tdetect, SyncRef UE. At this time, the interval in which the UE #1 100-1 performs the measurement is 400 ms.

However, the current standard document allows that if it is difficult for the UE transmitting the SLSS to transmit, then the SLSS transmission can be dropped only up to 2% (20*2%=400 ms) within 20 seconds. However, the 400 ms in which the SLSS transmission is dropped, may overlap with the measurement period (400 ms). In this case, there is a problem that the measurement accuracy of the S-RSRP can not be satisfied.

<Description of the Present Invention>

Therefore, the present specification represents a solution for solving the above-mentioned problems.

Before solving the problems described above, it is necessary to first consider two items. One is the time for detecting the synchronization reference UE (i.e., the SyncRef UE), and the other is the interval for measuring the synchronization reference UE (i.e., the SyncRef UE).

First, the detection time will be described as follows.

First, when the UE #3 (100-3), which is positioned within the coverage of the base station and can operate as a synchronization reference UE (SyncRef), does not perform uplink transmission to the base station, the time for detecting the UE #3 100-3 (i.e., the synchronization reference UE or the SyncRef UE) by the UE #1 100-1 will be described as follows.

In general, the UE #3 100-3 (i.e., the synchronization reference UE or the SyncRef UE) can transmit the SLSS every 40 ms. However, when the UE #3 100-3 (i.e., the synchronization reference UE or the SyncRef UE) transmits the uplink to the base station, it can drop the SLSS transmission. This is because the transmission to the base station has a higher priority than the SLSS transmission. Considering that the UE #3 100-3 (i.e., the synchronization reference UE or the SyncRef UE) can drop the SLSS transmission by a maximum of 2% within 20 seconds, opportunities for which the UE #3 100-3 (i.e., the synchronization reference UE or the SyncRef UE) is detected by the UE #1 100-1 becomes 10 times (=20 seconds/40 ms×2%).

During the 10 times, there is a chance that the UE #3 100-3 (i.e., the synchronization reference UE or the SyncRef UE) does not transmit the SLSS due to the uplink transmission to the base station. Considering the worst situation, i.e., during the 10 times of opportunities, in which the UE #3 100-3 (i.e., the synchronization reference UE or the SyncRef UE) drops all transmissions of the SLSS due to the uplink being transmitted to the base station, the UE #1 100-1 may not have an opportunity to detect the UE #3 100-3 (i.e., the synchronization reference UE or the SyncRef UE). However, there may be a situation in which the UE #3 100-3 (that is, the synchronization reference UE or the SyncRef UE) transmits SLSS 5 times during the above 10 opportunities. At this time, it is necessary to consider whether 20 seconds indicated by the Tdetect,SyncRef UE, is still valid. In order to obtain answers, it is required to examine the possibility of this situation to be occurred. Considering a situation where the UE #3 100-3 (i.e., the synchronization reference UE or the SyncRef UE) does not perform uplink transmission to the base station within 20 seconds at all, the number of times that the UE #3 100-3 (that is, the synchronization reference UE or the SyncRef UE) transmits the SLSS, becomes 500 times. With respect to the UE #1 100-1, assuming that UE #3 (100-3) (i.e., synchronization reference UE or SyncRef UE)-1) drops to transmit up to 2%, then the UE #1 100-1 has 10 chances to measure the SLSS received every 40 ms in the measurement period (i.e., 400 ms). The possibility that the UE #1 100-1 selects the subframe in which the SLSS is not actually received, among the number of times 500 for which the SLL can be received, may be very low. On the other hand, consider the SLSS transmission of UE #2 (100-2). Since the UE #2 100-2 is positioned outside the coverage of the base station, in order to receive the SLSS from the UE #2 100-2 operating as a synchronization reference UE (i.e., SyncRef UE), its SLSS transmission can be only drop up to 2% within 20 seconds. Therefore, the chance that the UE #2 (100-2) does not transmit SLSS is very low.

Second, an interval for measuring the synchronization reference UE (i.e., SyncRef UE) will be described as follows. There are 10 subframes (=400 ms/40 ms) in which the UE #1 100-1 can measure the SLSS transmitted from the UE #3 100-3 capable of operating as the synchronization reference UE. Among the 10 subframes, it is required to examine the possibility that the UE #3 100-3 drops the transmission of the SLSS due to the uplink transmission to the base station. In the worst case, among the 10 subframes, the UE #3 100-3 may drop all transmissions of the SLSS. In this case, there is no possibility that the UE #1 100-1 succeeds in the measurement. Therefore, the UE #1 (100-1) is required to prevent the UE #3 (100-3) from performing the measurement in the subframe in which the SLSS transmission is dropped. That is, the UE #1 100-1 should perform measurement on the subframe in which the UE #3 100-3 transmits the SLSS transmission. Also, since the measurement accuracy should be satisfied in five subframes, the UE #1 100 should perform measurement on the subframe in which the SLSS is transmitted from the UE #3 100-3 at least five times. Otherwise, the measurement period should be increased. In other words, the UE #3 100-3 can drop or delay the SLSS transmission up to 5 times for 400 ms, which is the measurement period of the UE #1 100-1. However, if averaging 10 opportunities (=20 sec/40 ms×2%) within 20 seconds, UE #3 100-3 will drop or delay the SLSS transmission for one opportunity (i.e., two seconds), then the UE #3 100-3 may drop or delay the SLSS transmission only once for 400 ms during the measurement period of the UE #1 100-1.

Taken the above description together, the above can be suggested as follows.

Proposal 1: The ProSe UE can measure the S-RSRP on the subframe in which the SLSS is transmitted from the synchronization reference UE (i.e., SyncRef UE).

Proposal 2: The ProSe UE can skip the measurement of the S-RSRP on the subframe in which the synchronization reference UE (i.e., SyncRef UE) performs uplink transmission to the base station and drops the SLSS transmission.

Proposal 3: If the synchronization reference UE (i.e., SyncRef UE) is positioned within the coverage of the base station, then the synchronization reference UE should transmit SLSS at least 5 times within 400 ms of the measurement period of the ProSe UE, such that the UE can satisfy accuracy in measurement of the S-RSRP.

Proposal 4: If the synchronization reference UE (i.e., SyncRef UE) is positioned within the coverage of the base station and the synchronization reference UE (i.e., SyncRef UE) fails to perform SLSS transmission at least five times within the measurement period of the ProSe UE, then the measurement period can be increased to satisfy the measurement accuracy in the S-RSRP of the ProSe UE.

Proposal 5: In order to ensure that the UE receiving the SLSS satisfy the measurement accuracy of the S-RSRP, when the UE transmitting the SLSS is positioned outside the coverage, the UE transmitting the SLSS can drop or delay the SLSS transmission at least once within the measurement period.

Proposal 6: If a test case is defined for the measurement accuracy of the S-RSRP for the SLSS from the synchronization reference UE (i.e., SyncRef UE) positioned within the coverage of the base station, then the transmission to the base station for 400 ms during the measurement period, may be defined to be performed depending on a transmission pattern (e.g., 0101010101, where 1 means transmission to the base station).

Proposal 7: If a test case is defined for the measurement accuracy of the S-RSRP for the SLSS from the UE positioned outside the coverage of the base station, then the transmission to the base station during the measurement period of 400 ms, may be assumed to be only dropped or delayed at least once.

On the other hand, the following items are required to be additionally considered for proposals 3 and 4 above.

The interval in which the measurement accuracy of the S-RSRP is to be satisfied (i.e., 5 subframes) utilizes the predetermined interval for the RSRP measurement accuracy using the existing CRS. However, when the number of REs of CRS existed in one subframe is compared with the number of REs of SLSS (including DMRS), then it is SLSS/CRS=6*2/4=3 times. That is, the number of REs in the SLSS existed in one subframe is three times larger than the number of REs in the CRS. Therefore, considering 5 times/3 times=1.7=about 2 times, the proposal 3 can be modified as follows.

Proposal 3-1: If the SyncRef UE is positioned within the coverage of the base station, then the UE should transmit the SLSS at least twice, within the measurement period of 400 ms of the ProSe UE so that the ProSe UE can satisfy the measurement accuracy of the S-RSRP.

Accordingly, the proposal 4 can be modified as follows.

Proposal 4-1: If the synchronization reference UE (i.e., SyncRef UE) is positioned within the coverage of the base station, and the synchronization reference UE (i.e., SyncRef UE) do not perform the SLSS transmission at least twice within the measurement period of the ProSe UE, then the measurement period may be increased to satisfy the measurement accuracy of the S-RSRP of the ProSe UE.

The above-mentioned proposals are summarized in the drawings.

Figure 10:
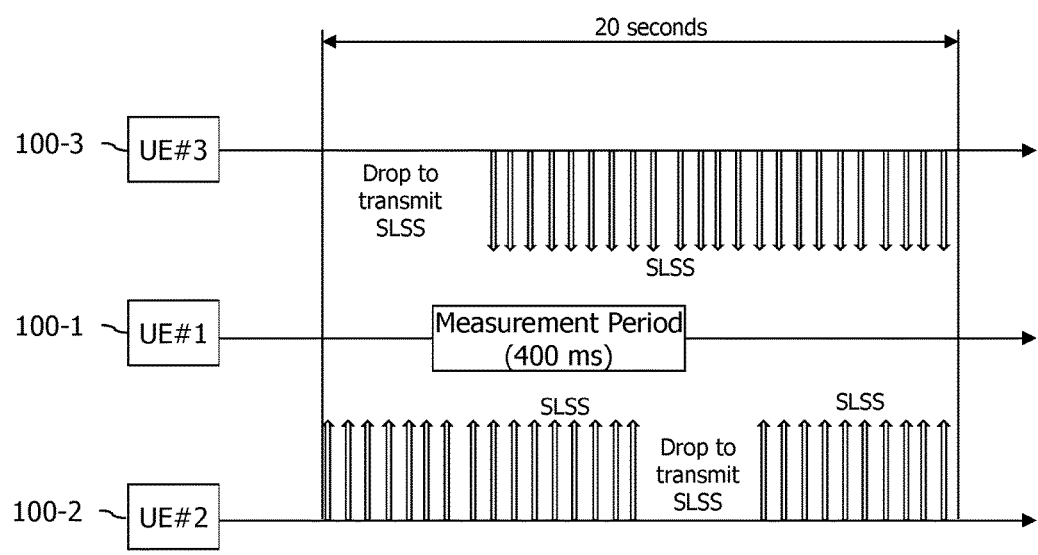
FIG. 10 is an exemplary diagram illustrating a proposal according to the disclosure of the present disclosure.

FIG. 10 is an Exemplary Diagram Illustrating a Proposal According to the Disclosure of the Present Disclosure.

Referring to FIG. 10, the above-described proposals will be summarized as follows.

Proposal A: A UE capable of performing ProSe direct communication, such as UE #2 100-2 or UE #3 100-3, should be able to transmit the SLSS at least 5 times during the measurement period of 400 ms. Otherwise, the measurement period of the UE receiving the SLSS, e.g., UE #1 100-1, is increased. Therefore, the UE that transmits the SLSS, i.e., the UE #2 100-2 or the UE #3 100-3, can drop or delay the SLSS transmission up to once during the measurement period.

Proposal A-1: It is assumed that a UE capable of performing ProSe direct communication, that is, UE #1 100-1 is a UE that transmits the SLSS during the measurement period of 400 ms, that is, UE #2 100-2 or UE #3 100-3 transmits the SLSS at least 5 times. Otherwise, the measurement period of the UE receiving the SLSS, i.e., UE #1 100-1, is increased. Therefore, the UE receiving the SLSS, that is, the UE #1 100-1, assumes that the UE transmitting the SLSS, i.e., the UE #2 100-2, or the UE #3 100-3 can drop or delay the SLSS transmission within the measurement period.

Proposal B: The UE capable of performing ProSe direct communication, that is, UE #2 100-2 or UE #3 100-3 should be able to transmit the SLSS at least twice during the measurement period of 400 ms. Otherwise, the measurement period of the UE receiving the SLSS is increased. Therefore, the UE that transmits the SLSS, i.e., the UE #2 100-2 or the UE #3 100-3, can drop or delay the SLSS transmission up to once during the measurement period.

The embodiments of the present invention described so far may be implemented by various means. For example, embodiments of the present invention may be implemented by hardware, firmware, software, or a combination thereof. More specifically, the description will be made with reference to the drawings.

Figure 11:
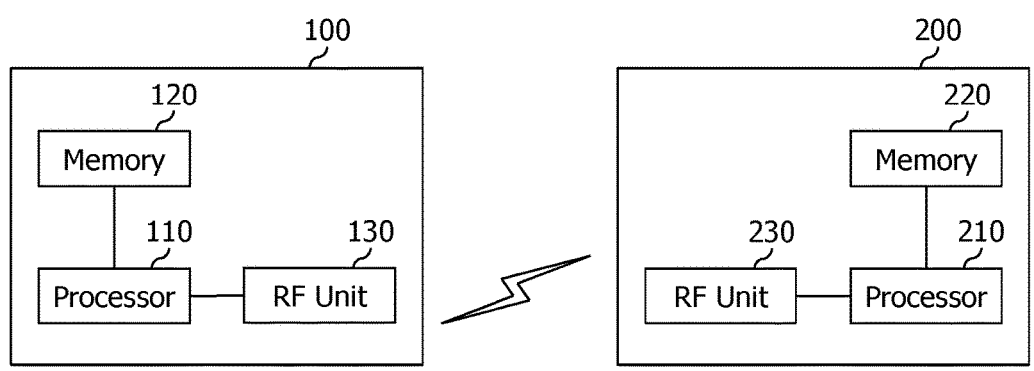
FIG. 11 is a block diagram illustrating a wireless communication system in which the present disclosure of specification is implemented.

FIG. 11 is a block diagram illustrating a wireless communication system in which the present disclosure of specification is implemented.

The base station 200 includes a processor 201, a memory 202 and an RF unit (radio frequency (RF) unit 203). The memory 202 is coupled to the processor 201 and stores various information for operating the processor 201. The RF unit 203 is coupled to the processor 201 to transmit and/or receive a radio signal. The processor 201 implements the proposed functionality, process and/or method. In the above-described embodiment, the operation of the base station can be implemented by the processor 201.

The UE 100 includes a processor 101, a memory 102 and an RF unit 103. The memory 102 is connected to the processor 101 and stores various information for driving the processor 101. The RF unit 103 is coupled to the processor 101 to transmit and/or receive a radio signal. The processor 101 implements the proposed functions, procedures and/or methods.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module is stored in memory and can be executed by the processor. The memory may be internal or external to the processor and may be coupled to the processor by any of a variety of well known means.

In the exemplary system described above, although the methods are described on the basis of a flowchart as a series of steps or blocks, the present invention is not limited to the order of the steps, and some steps may occur in different orders with different steps or simultaneously. It will also be appreciated by those skilled in the art that the steps shown in the flowchart are not exclusive and that other steps may be included or that one or more steps in the flowchart may be eliminated without affecting the scope of the invention.

What is claimed is:

1. A method for receiving a sidelink synchronization signal: (SLSS) for a proximity service (ProSe), the method performed by a ProSe user equipment (UE) and comprising:
   receiving a SLSS from a neighboring ProSe UE; and
   measuring a reference signal received power (RSRP) with respect to the SLSS,
   wherein the measurement is performed by regarding that the neighboring ProSe UE does not drop up to one a transmission of the SLSS during a measurement period, and
   wherein if the neighboring ProSe UE drops more than one the transmission of the SLSS during the measurement period, the measurement period is extended.

2. The method of claim 1, wherein the measurement period is 400 ms, and
   wherein the SLSS is transmittable from the neighbor ProSe UE with a period of 40 ms.

3. The method of claim 1, wherein the measuring is performed by regarding that the SLSS transmission from the neighboring ProSe UE is to be dropped up to 2% within 20 seconds.

4. The method of claim 1, wherein the measuring further comprising:
   determining whether the measured RSRP for the SLSS meets an accuracy of absolute reference and accuracy of relative reference.

5. The method of claim 1, further comprising:
   selecting the neighboring ProSe UE as a synchronization reference UE, when the measured RSRP for the SLSS is greater than a predetermined minimum requirement by a predetermined hysteresis.

6. The method of claim 5, wherein the selecting further comprising:
   determining whether the neighboring ProSe UE is positioned within the coverage of a base station.

7. A User Equipment (UE) for receiving a Sidelink Synchronization signal (SLSS) for Proximity Service (ProSe), comprising:
   a RF unit; and
   a processor configured to control the RF unit to receive a SLSS from a neighboring ProSe UE, and to measure a reference signal received power (RSRP) of the SLSS during a predetermined measurement period,
   wherein the measurement is performed by regarding that the neighboring ProSe UE does not drop up to one a transmission of the SLSS during a measurement period, and
   Wherein if the neighboring ProSe UE drops more than one the transmission of the SLSS during the measurement period, the measurement period is extended.

8. The UE of claim 7, wherein the measurement period is 400 ms, and
   wherein the SLSS is transmittable from the neighbor ProSe UE with a period of 40 ms.

9. The UE of claim 7, wherein the measurement is performed by considering that the SLSS transmission from the neighboring ProSe UE is to be dropped up to 2% within 20 seconds.

10. The UE of claim 7, wherein the processor, upon the measurement, determines whether the measured RSRP for the SLSS meets an accuracy of absolute reference and accuracy of relative reference.

11. The UE of claim 7, wherein the processor selects the neighboring ProSe UE as a synchronization reference UE, when the measured RSRP for the SLSS is greater than a predetermined minimum requirement by a predetermined hysteresis.

12. The UE of claim 11, wherein the processor, upon the measurement, determines whether the neighboring ProSe UE is positioned within the coverage of a base station.

* * * * *

UNITED STATES PATENT AND TRADEMARK OFFICE
CERTIFICATE OF CORRECTION

PATENT NO. : 10,200,215 B2
APPLICATION NO. : 15/563096
DATED : February 5, 2019
INVENTOR(S) : Yoonoh Yang Page 1 of 1

It is certified that error appears in the above-identified patent and that said Letters Patent is hereby corrected as shown below:

In the Claims

Column 20, Line 17, delete "a"

Column 20, Line 54, delete "a"

Signed and Sealed this
Twenty-first Day of May, 2019

Andrei Iancu
*Director of the United States Patent and Trademark Office*